US007667612B2

(12) United States Patent
Sepponen

(10) Patent No.: US 7,667,612 B2

(45) Date of Patent: Feb. 23, 2010

(54) METHOD AND ARRANGEMENT FOR MONITORING AN OBJECT VIA CHANGES IN COUPLING IMPEDANCE WITHIN A TRANSDUCER

(75) Inventor: Raimo Sepponen, Helsinki (FI)

(73) Assignee: Elsi Technologies Oy, Espoo (FI)

( * ) Notice: Subject to any disclaimer, the term of this patent is extended or adjusted under 35 U.S.C. 154(b) by 267 days.

(21) Appl. No.: 10/568,545

(22) PCT Filed: Aug. 20, 2004

(86) PCT No.: PCT/FI2004/000489

§ 371 (c)(1), (2), (4) Date: Sep. 22, 2006

(87) PCT Pub. No.: WO2005/020171

PCT Pub. Date: Mar. 3, 2005

(65) Prior Publication Data

US 2007/0008145 A1 Jan. 11, 2007

(30) Foreign Application Priority Data

Aug. 20, 2003 (FI) .................................. 20031172
Jan. 15, 2004 (FI) .................................. 20040044

(51) Int. Cl.
*G08B 21/00* (2006.01)
*G01B 7/16* (2006.01)
*G01L 1/00* (2006.01)

(52) U.S. Cl. ............................ 340/665; 73/771; 73/774

(58) Field of Classification Search .............. 340/870.3, 340/870.37, 457, 457.1, 530, 566, 665–667, 340/541, 545.2, 550; 73/767, 768, 771, 774, 73/780

See application file for complete search history.

(56) References Cited

U.S. PATENT DOCUMENTS

| | | | | | |
|---|---|---|---|---|---|
| 4,194,194 | A * | 3/1980 | Redfern | ...................... | 340/566 |
| 4,296,754 | A | 10/1981 | Hennig et al. | | |
| 5,210,500 | A | 5/1993 | Pingel et al. | | |
| 5,235,319 | A | 8/1993 | Hill et al. | | |
| 5,386,196 | A | 1/1995 | Jones et al. | | |
| 5,404,128 | A * | 4/1995 | Ogino et al. | ............. | 340/425.5 |
| 5,886,615 | A * | 3/1999 | Burgess | ...................... | 338/114 |
| 6,025,782 | A | 2/2000 | Newham | | |
| 6,335,684 | B1 * | 1/2002 | Eisenmann et al. | ......... | 340/562 |

(Continued)

FOREIGN PATENT DOCUMENTS

EP 0387996 B1 9/1990

(Continued)

*Primary Examiner*—Jennifer Mehmood
(74) *Attorney, Agent, or Firm*—Drinker Biddle & Reath LLP

(57) ABSTRACT

A method and an arrangement to monitor localization, movement, and properties of an object, such as human body. An excitation signal is connected to a first division of selected conductors of a transducer which includes a distribution of conductors such as a matrix. A first signal including information about coupling impedance between a first and a second selected division of conductors is derived from a coupling of the excitation signal between the first and the second selected divisions of conductors of said transducer. The object is monitored by studying changes of the coupling impedance caused by the object to be monitored during subsequent repeated cycles of the above mentioned steps.

39 Claims, 6 Drawing Sheets

U.S. PATENT DOCUMENTS

| | | | | |
|---|---|---|---|---|
| 6,359,597 | B2 | 3/2002 | Haj-Yousef | |
| 6,407,556 | B1 | 6/2002 | Rudeke | |
| 6,515,586 | B1 * | 2/2003 | Wymore | 340/541 |
| 6,853,306 | B1 * | 2/2005 | Nitschke et al. | 340/667 |
| 6,965,311 | B1 * | 11/2005 | Karner | 340/539.12 |
| 7,272,431 | B2 | 9/2007 | McGrath | |
| 2006/0055418 | A1 | 3/2006 | Ogilvy et al. | |

FOREIGN PATENT DOCUMENTS

| | | | |
|---|---|---|---|
| GB | 2324373 | A | 10/1998 |
| WO | 90/10920 | | 9/1990 |
| WO | 00/75417 | A1 | 12/2000 |
| WO | WO 01/29520 | A1 | 4/2001 |
| WO | WO 03/050490 | A2 | 6/2003 |
| WO | WO 2004/013611 | | 2/2004 |
| WO | WO 2004/068172 | | 8/2004 |

* cited by examiner

METHOD AND ARRANGEMENT FOR MONITORING AN OBJECT VIA CHANGES IN COUPLING IMPEDANCE WITHIN A TRANSDUCER

CROSS-REFERENCES TO RELATED APPLICATIONS

The present application is a National Stage Application filed under 371 of International Application No PCT/FI2004/000489 filed on Aug. 20, 2004, which claims the benefit of priority to application no. 20031172 filed in Finland on Aug. 20, 2003 and to application no. 200400 filed in Finland on Jan. 15, 2004.

BACKGROUND OF THE INVENTION

The invention is related to a method and an arrangement for monitoring of a location, movement, and properties of an object, such as a person, an animal or a device, for processing information concerning this and generation and forwarding of information derived from this and performing eventual informing, alarming and controlling functions A monitoring of the condition of senior citizens in home environment is necessary, if one is willing to increase the potential of aging people to manage themselves in home environment. The solutions introduced up until now have not proved to be very practicable. Wrist worn security devices are generally in use. These have such a weakness that a user has to wear a wristband device continuously and be able to push an alarm button in emergency. There are also wrist worn devices which observe the status of health but these have problems with false alarms. One has tested also such solutions, where one installs folio from piezoelectric material, which registers vibration generated by movement. This has such a weakness that it is not able to recognize an immobile person In addition this is also sensitive to other vibrations of the building, which leads to poor sensitivity or false alarms.

It has also been suggested a possibility to use video cameras of for example motion sensors based on infrared light detection, but also these solutions have not proven themselves to be successful. In addition there are some privacy questions related to a use of cameras.

With all present solutions there is also problematic data manipulation, which assumes much human labour and therefore these are not proper for a service of large customer volumes. Despite of this with these one can not get such important information as if the customer is getting his or her medication, if he or she visit kitchen having meal or if he or she is going out during night-time.

One needs solutions for detection of movement also in monitoring of various areas in industrial halls and animal shelters. These same problems described above are present also in these activity areas.

SUMMARY

By using the method and arrangement of the invention one may avoid the problems with present technology and devise an arrangement, which corresponds the requirements of the requirements of the needs according of the use. It is characteristics to the invention, which is expressed in attached claims.

BRIEF DESCRIPTION OF THE DRAWINGS

The invention is elucidated with attached figures, from which

DETAILED DESCRIPTION OF THE PREFERRED EMBODIMENTS

Figure 1:
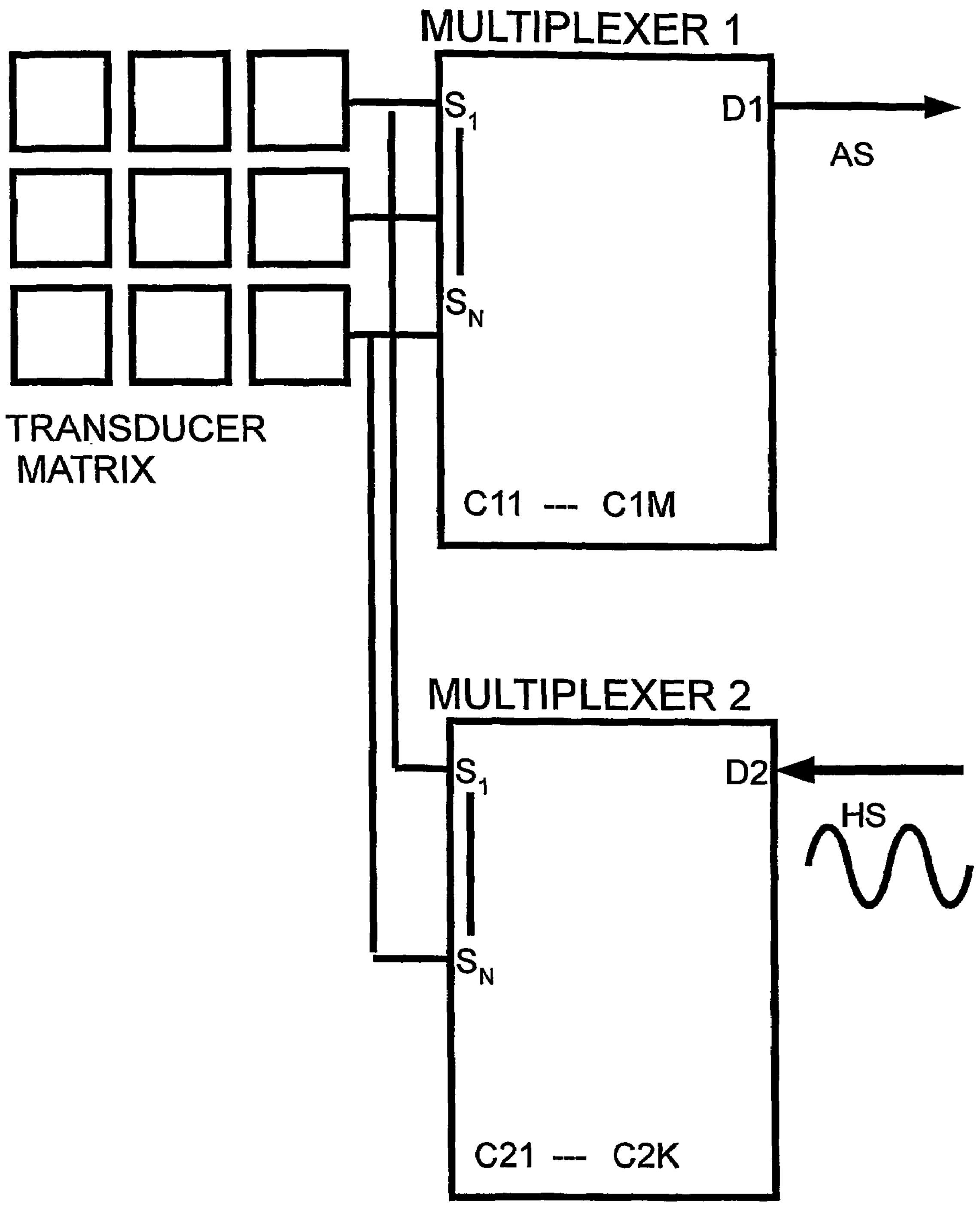
FIG. 1 shows one realization of a transducer at a level of principle
Figure 5:
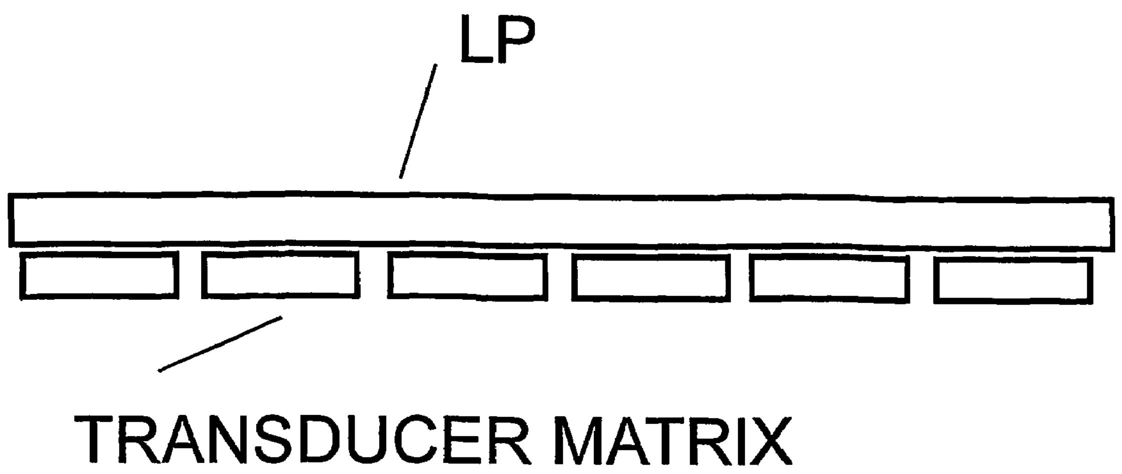
FIG. 5 shows a placement of a transducer matrix of the invention below a floor covering
Figure 6:
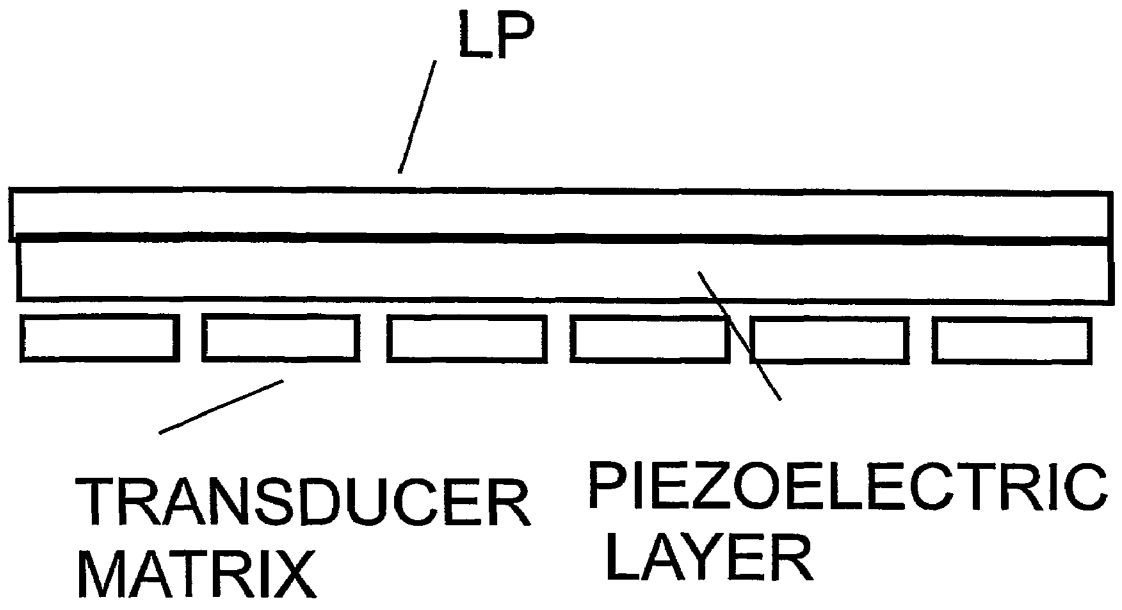
FIG. 6 shows a placement of a transducer matrix of the invention below a floor covering when the transducer matrix registers mechanical vibrations of floor
Figure 7:
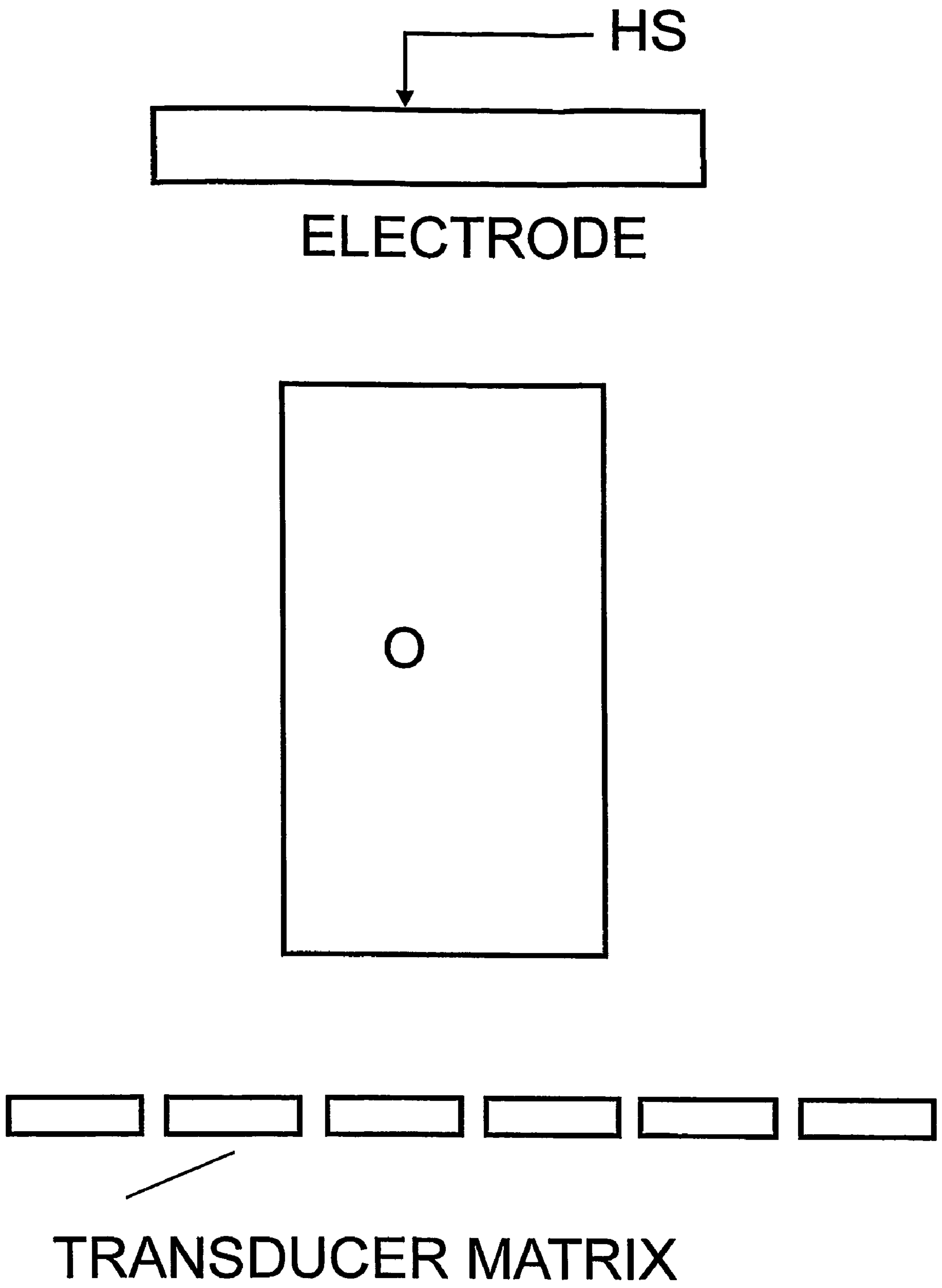
FIG. 7 shows one placement of transducer matrix below floor covering when counter electrode is placed over an object to be monitored

FIG. 1 shows a block diagram describing the function of one arrangement of the invention. The transducer TRANSDUCER MATRIX may be composed from N pieces of conductive plates galvanically isolated from each other and which are placed under floor coverings LP as shown in FIG. 5 or 6.

Figure 4:
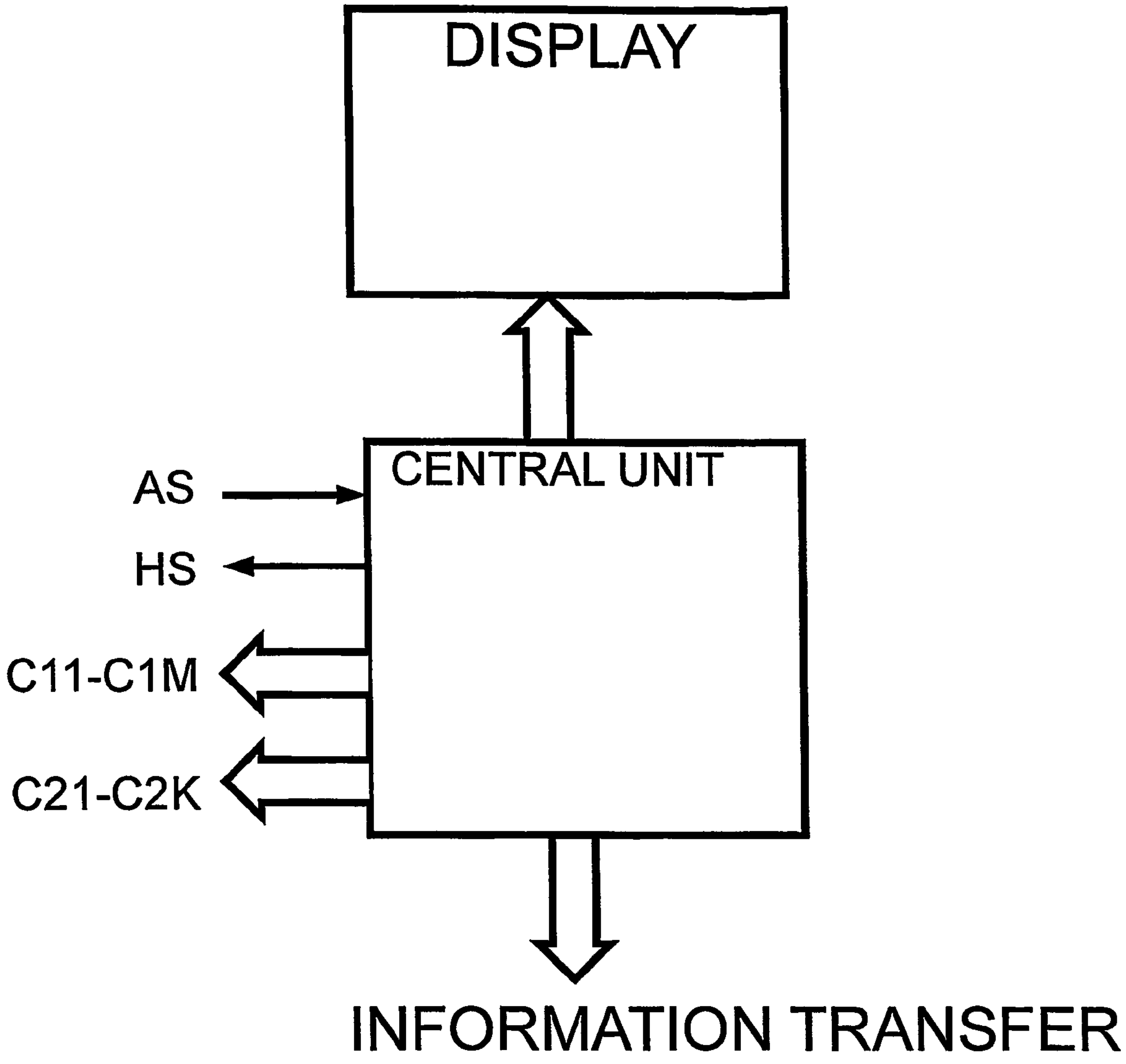
FIG. 4 shows data processing components at a level of principle

Each of the plates is connected to two multiplexers MULTIPLEXER and MULTIPLEXER 2. In each of them there are signal connections S1 . . . SN corresponding these connections. MULTIPLEXER 2 receives its control signals C21-C2K from the central unit CENTRAL UNIT as shown in FIG. 4.

With these control signals MULTIPEXER 2 selects that element of the transducer or those elements of the transducer, to which the excitation signal HS connected to the input D2 is coupled. HS is generated by an oscillator or a syntethisator, which is not shown in the figures.

Figure 2:
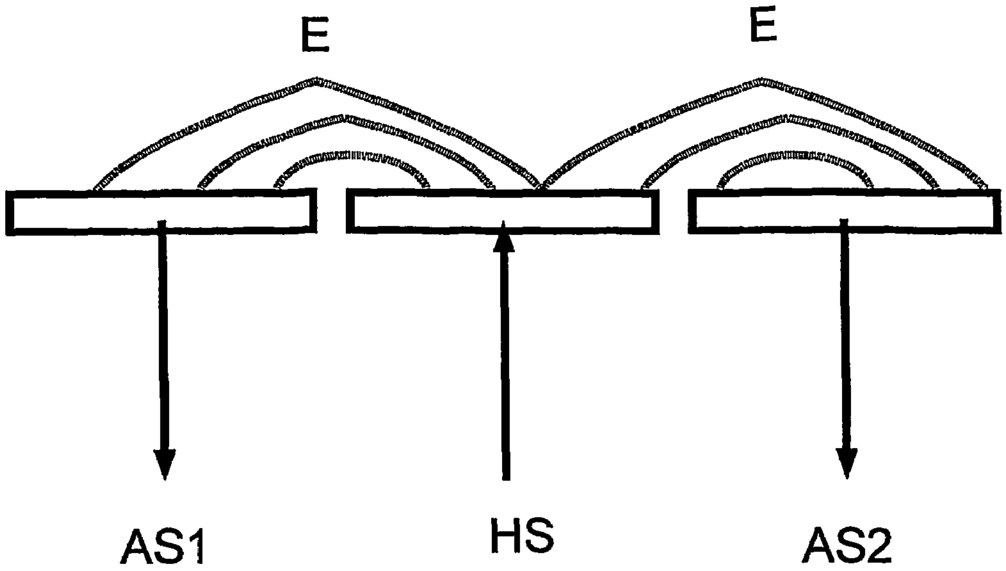
FIG. 2 shows an operation principle of a segment of transducer, when there are not any object to be monitored near this segment
Figure 3:
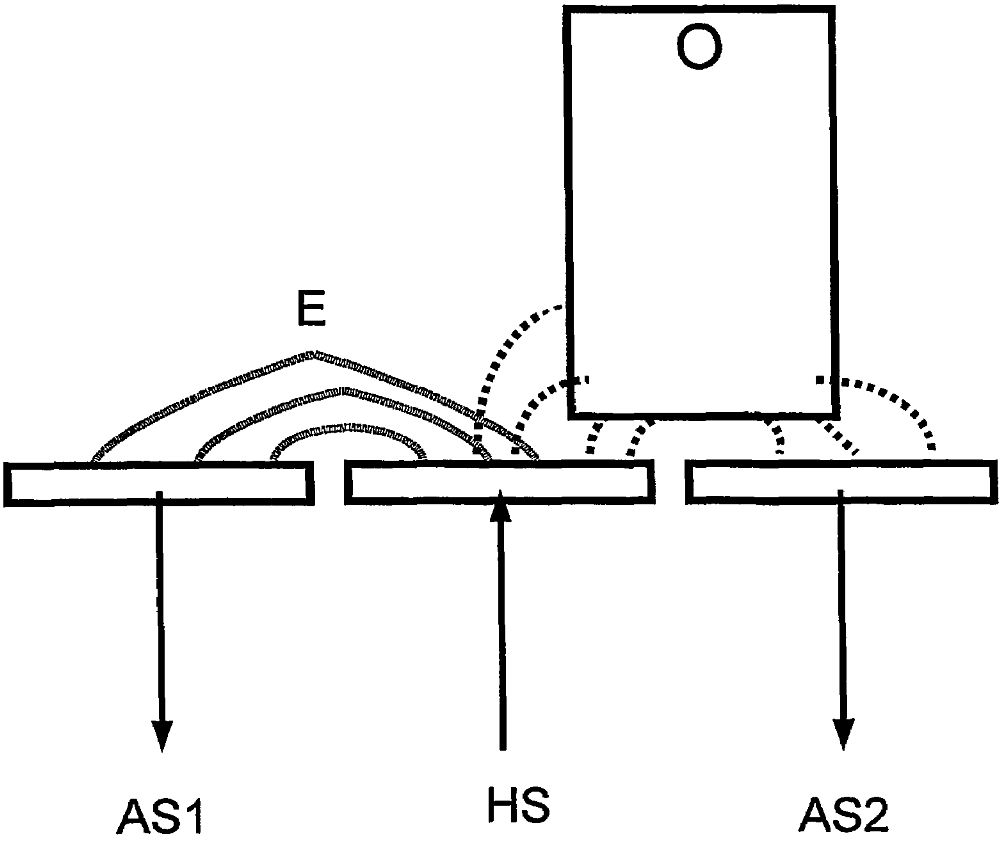
FIG. 3 shows an operation principle of a segment of transducer, when there are an object to be monitored near this segment

MULTIPLEXER 1 connects according to control signal C11-C1K one or several elements of the transducer to the central unit and this signal is AS in FIG. 1. When an object O is not near the elements of the transducer, the elements of the transducer are coupled via an electric field E as shown in FIG. 2. FIG. 3 shows how an object O is affecting the electric field E between the elements of the transducer.

Hence, in order that one may localise O by using transducer elements of the transducer TRANSDUCER MATRIX, one must repeat the above mentioned connection operations in such a way that HS is coupled to one or several other transducer elements and registration will be preformed via the multiplexer MULTIPLEXER 1 from other transducer elements.

It should be noted that because of large areas of accurate localisation the transducer TRANSDUCER MATRIX includes several sub-divisions i.e. elements, which may be connected to devise distributions of conductors.

This repeating of the events of measurements is predetermined in one or another way by using the central unit CENTRAL UNIT. This coupling may change according to time or a change in the monitoring need.

A predetermined control includes also a randomly variable coupling, by which one is aiming to reveal the monitoring sequence in safety and monitoring applications. It is beneficial to the construction of the transducer that it includes a distribution of conductors which is composed from galvanically isolated sub-divisions or from sub-divisions between them there is different electrical impedance than in an element of the transducer. Above, one has described a transducer which is a matrix composed from galvanically isolated elements. In this way one may devise a transducer, to which the introduced excitation signal HS has a low frequency such as 500 Hz-50 kHz.

According to the invention one may derive the signal AS from the excitation signal HS in various ways. It is essential that AS includes information about impedance, which is between the first division of conductor and the second division of conductor.

In addition one must note that as the excitation signal HS is coupled to the various divisions of conductors of the transducer TRANSDUCER MATRIX one may select the divisions of conductor according to the need. These connected divisions of conductors form the first division of conductor.

Accordingly one may select according to the need those divisions of conductor referenced to which one studies coupling impedance and these divisions of conductor form the second division of conductor. In other words the first and second divisions of conductor may be formed by a controlled multiplexer from several distinct divisions of conductor and the shape and size of the first and second divisions of conductor may be varied according to the need.

The transducer may be beneficially devised by using flexible material such as plastic. In such a transducer made from plastic there are multiple layers from which some is forming a distribution of conductor. The conductor may be from metal alloy, metal, graphite mixture or conductive plastic. The distribution of conductor may be formed by electrochemical process, printing or painting. It is also possible to vaporise distribution of conductor on a plastic surface. Conductor may be laminated between plastic foils. In this case the patterning of the distribution of conductor is performed by laser or by water cutting.

It may be noted that even one has given the term TRANSDUCER MATRIX to describe the transducer, and matrix is a known term in mathematics and usually is associated with a table with a square shape so in this case this is not referring to the physical shape of the transducer.

The transducer may be composed from a distribution of conductor which includes distributions of conductor with variable shapes and sizes and these may be parts from other entities these may be called also elements. So as one distribution of conductor of the transducer may serve parts of heating, water plumping or air conditioning system or for example a section of concrete iron of a building.

In many applications it is advantageous perform mapping a status of the stable environment at first in other words to map the mutual coupling between distributions of conductor then when essentially immobile and changeless objects and constructions are at their positions. This situation prevails for example in an apartment when furniture is at its position but there are not any people, domestic animals or robots. This mapping information will be stored in a system, such as memory means, which are in the central unit or via an information network to connected memory means, which may be situated for example in a control center or in a service center. Because of this the arrangement must include memory means, which may be in the central unit or connected to that via an information network.

In following the above described operation sequence, where CENTRAL UNIT selects as guided by its program, that or those transducer elements to which the excitation signal HS is connected (The first division of conductor) via MULTIPLEXER 1 and via MULTIPLEXER 2 those transducer elements to which coupled transducer signal AS is lead to the central unit (The second division of conductor) is called a scanning cycle.

The scanning cycle will be repeated so many times that TRANSDUCER MATRIX is covered with a desired accuracy over a desired area. The accuracy and the area may be varied depending on the situation and on the point of time. For example, if the object O is detected in some area of the transducer TRANSDUCER MATRIX, the neighbourhood of this area may be scanned during next scanning cycle in a more accurate manner. In addition it is possible that if some electromagnetic noise is coupled to the transducer or to other equipment or if the signal is weak because of some other reason, one may average signal several times in order to improve the signal to noise ratio.

In order to improve the signal to noise ratio one may use an excitation signal HS which is modulated and use modulation information in processing of signal AS. One possibility is to use a phase sensitive detector in processing of the signal AS: Different functions in a body generate some impedance variations between different parts of the body, such functions are among others functions of respiration and heart. These both functions have been studied by using impedance measurements. Measurements of the function of the heart for example ion order to determine the stroke volume are called impedance cardiography. In this way it is possible to study via coupling between different elements of the transducer the function of respiration and heart of a collapsed person which lays over the transducer TRANSDUCER MATRIX. Because of this CENTRAL UNIT controls the signal acquisition in such a way that the impedance changes corresponding to these functions may be detected maximally. The impedance changes produced by the cardiac function are periodical repeating at an approximate frequency 0.5-3 Hz. The major frequency components are below 30 Hz, The characteristic properties of impedance changes caused by the cardiac function such as components at relatively high frequency included by a QRS-complex, may be used for recognizing of the signal.

The waveform caused by respiration are also characteristic and their repeating frequency is approximately 0.3-0.05 Hz. Frequency content lies clearly below 1 Hz. The operating frequency of respiration and heart may be detected by using signal processing methods such as Fourier transformation.

By selecting that or those divisions of conductor of the transducer TRANSDUCER MATRIX (the first and the second divisions of conductor), between which the coupled excitation signal HS and detection signal AS provide best the impedance changes corresponding the cardiac or respiration functions, one may get the measuring result as accurate as possible. In some cases it is needed to recognize the object O or at least differentiate the object O from other objects in the area to be monitored. For example a robot may differ clearly in conductivity from a human body. A size of a child or an animal and heart rate differ from a size of an adult and heart rate of an adult. Also O may contain some means which modulates intentionally an electric coupling, such means are for example electrically conductive parts which are moved by a motor.

Additionally one may use the transducer TRANSDUCER MATRIX in monitoring movements of an object O. For this purpose CENTRAL UNIT contain a necessary program and information about characteristic properties of signals to be detected. Generally, CENTRAL UNIT may from signal observed via the transducer derive some information about electrical conductivity of an object O and from temporal changes in conductivity.

CENTRAL UNIT may start a maximization of said signals when it detects a change in impedance which covers an area larger than that corresponding normal walking that is an object O has collapsed on the are monitored by the transducer and the corresponding change stays immobile a longer period than a preset time limit.

Generally scanning cycles need not to be repeated in a similar way. It may be advantageous that for example when the area to be monitored should be empty during a certain time period one applies such scanning cycles, which target scanning operations on those elements of the transducer, which are close doors, windows and other possible points to enter the area. For example in a museum there may be some artefacts which are especially valuable and the surroundings of these must be monitored more keenly. Additionally it is advantageous that the scanning cycle is in these cases somewhat random so that information which may be obtained from the scanning cycle may not be utilized.

One possibility is that the transducer TRANSDUCER MATRIX contain also a piezoelectric layer i.e. a layer which reacts vibrations and which generates a strong signal for example because of fall PIEZOELECTRIC LAYER in FIG. 6. For this purpose the system includes a specific electronic circuit, which is connected to the central unit. If this piezoelectric membrane is divided in elements according to the transducer TRANSDUCER MATRIX, one may use that for localization of the generation site of the vibrations and as a microphone for a person lying on the floor, In this case the central unit connects via a multiplexer and an amplifier the piezoelectric element below the object for example to a telephone system. In the FIG. 6 there is TRANSDUCER MATRIX which includes a piezoelectric layer, In this case the transducer TRANSDUCER MATRIX or at least its piezoelectric part must be acoustically well coupled to the floor covering, CENTRAL UNIT may also monitor the timing of activity events of an object O, For example, a person acting as an object O must obtain medication from a certain location at a certain time. If he or she has not visited at the location for medication within certain time, CENTRAL UNIT will give a note about this using for example synthesised speech.

Likewise if a person attempts to leave the apartment at night will this be detected by CENTRAL UNIT and will give a notice about this and if this notice is not leading to a desired situation may CENTRAL UNIT send an alarm to a monitoring center via information network, telephone or the like. One convenient communication path for the central unit is a digital television network, which includes a return channel used for various services. In the future a digital television receiver is fairly common in home and institutional environments. The said notice can be made by using an indicator sound, an indicator light, or a synthetic speech or any combination of these.

Other topics for monitoring may be among others WC visits, kitchen visits (monitoring of eating), exceptional activity during night time, monitoring of a number of people (safety).

One information characterizing a condition of O and changes in that is speed of movement under observation. By using the method of the invention one may investigate a speed of transfer of an object O in an area to be monitored. For example changes in a distribution of speed of movements of a person may indicate some changes in a condition of the person.

For example a person may perform al normal daily activities but because for example of a disease may move considerable more slowly in other words the components of speed distribution corresponding fast movement will be missing or their strength will be markedly lower.

This distribution of speed may be characterised by some calculated quantity which is derived from a registered speed distribution. One such quantity is the median of the speed distribution. Additionally one may use the standard deviation of the speed distribution. It must be taken in account that in monitoring of the speed distribution one must use information collected during a relatively long period of time.

Here one may utilize calculation of trends. Trends indicate changes which take place during a longer period of time.

Generally one may transfer information between CENTRAL UNIT and some receiver via telephone, wired wide band connection, wireless connections, or acoustical or optical connection. In information transfer it is advantageous to take in account information security and privacy matters, which are covered by several authority regulations. To a central unit CENTRAL UNIT one may connect more than one transducers TRANSDUCER MATRIX.

Safety may be monitored for example as follows: A resident of an apartment will go to sleep in a bed. If someone after this arrives in the apartment the arrangement performs alarm functions, which may be predetermined. The alarm functions may include an initialization of some alarm signal functions (buzzer, light, siren, alarm bell), connection to alarm or service center, contacting to a monitoring person or to a relative. To perform these tasks the arrangement should include means to process time information such as a clock circuit.

CENTRAL UNIT may include functions which adapt them selves according to changes in an area to be monitored and in behaviour of people and detect changes in behaviour. In such solutions one may utilize neural networks, associative techniques or self organizing networks. These techniques are generally called artificial intelligence. For a use of the method and the arrangement of the invention it is advantageous to set criteria by which information obtained from signals AS and IS will be evaluated. These criteria may be constant or variable, based for example on artificial intelligence and which may take into account also other information such as inside and outside temperature, time, a level of noise etc.

A transducer arrangement may be devised also in such a way that the excitation signal HS is introduced via an electrode above an object and a measured signal AS is obtained from a transducer TRANSDUCER MATRIX below the object O. In this way one may easily detect from a coupling between the electrode and the transducer when a targeted person is standing or sitting. The parts of a transducer in ceiling, walls or in other surfaces may be generally considered as elements of the transducer TRANSDUCER MATRIX or as separate transducers. A transducer TRANSDUCER MATRIX may be placed either partially or completely in other surfaces than in a floor, for example in walls or doors. Then it may be used for example in control functions such as to control lighting, air conditioning or locking.

Generally at least some of the transducer elements of the transducer TRANSDUCER MATRIX are placed near surfaces of the area to be monitored, such surfaces as floor, wall, door, or ceiling surfaces, and on which or near which an object O has an access.

It is possible that in some solutions one utilizes other conductors of a building, such as concrete iron, air conditioning pipes, water pipes electric wiring. Then these conductors may be utilized in a same way as other elements of a transducer or generate a reference conductor from these conductors, to which a coupling from other transducer elements will be registered. This may be realised in such a way that the arrangement introduces excitation signal to said other conductors or to some of those, and the coupling of the excitation signal to the elements of the transducer TRANSDUCER MATRIX will be registered. Another way is that the said other conductors or some of them form a reference level to which a coupling of excitation signal from other elements of the transducer TRANSDUCER MATRIX is registered using the arrangement.

It is possible that some of the functions of CENTRAL UNIT are performed via information network in some other place such as in a monitoring centrum or in a service center. The examples described above are mainly concerning monitoring in home environment. It is obvious that the system may be used in other environments such as in museums, banks, industrial halls, offices, storages, prisons, jails, gyms, schools and animal shelters. In following these and other potential environments are called generally environments to be monitored and actions related to monitoring are called monitoring actions.

With the system one may monitor also environments, in which O does not have or should not have an access. Then at least some elements of a transducer TRANSDUCER MATRIX are placed near such surfaces, such as near dangerous or valuable items, near which an object O does not have or should not have and access or any reason to go.

The system may also control some functions in an environment to be monitored, such functions may include lighting, air conditioning, access control, locking, other alarm, control or monitoring functions or control of robot equipment in the environment. Via a transducer TRANSDUCER MATRIX one may deliver to a robot moving in the environment to be monitored some controlling commands and for example localization information.

For example localization information may be delivered to a robot via an element of the transducer TRANSDUCER MATRIX in such a way that to each element one sends a signal including the localization information and a robot near an element receives from it information about its localisation. In an emergency situation one may guide the robot to the site from where the alarm has been received—The robot may have a camera or a phone and one may via these make contact from a monitoring centrum, service centrum or from other similar environment to the site from which the alarm has been sent. Other mode of action is that the localization information is delivered to a robot via some other communication path, either via wireless or wired transmission path. A wireless transmission path may be inductive field, electric field, electromagnetic radiation, light (e.g. infrared light) or sound (e.g. ultrasound).

In this case CENTRAL UNIT includes necessary means, such as Bluetooth, WLAN or the like transceiver means. Localisation may also take place in such a way that a robot includes means to receive a field emitted by an element of a transducer TRANSDUCER MATRIX and this field is at its maximum when the robot is at immediate vicinity of a transmitting element. This localisation action may be distinct from a scanning cycle, and it may be activated in a regular manner, after known fixed period or after essentially random periods or by request of some outsider or of some system or connected to some certain event such as when CENTRAL UNIT detects a fall of a person Lighting the system may be control in such a way that according to detected movements or eventually anticipating controlling lights on and off. For example the system may control lights during night time and when a person leaves a bed in such a way that a path from bed to WC is lit and correspondingly when the person returns back to the bed the system turns the lights off. Generally those functions which are controlled by the system are called functions to be controlled.

Figure 8:
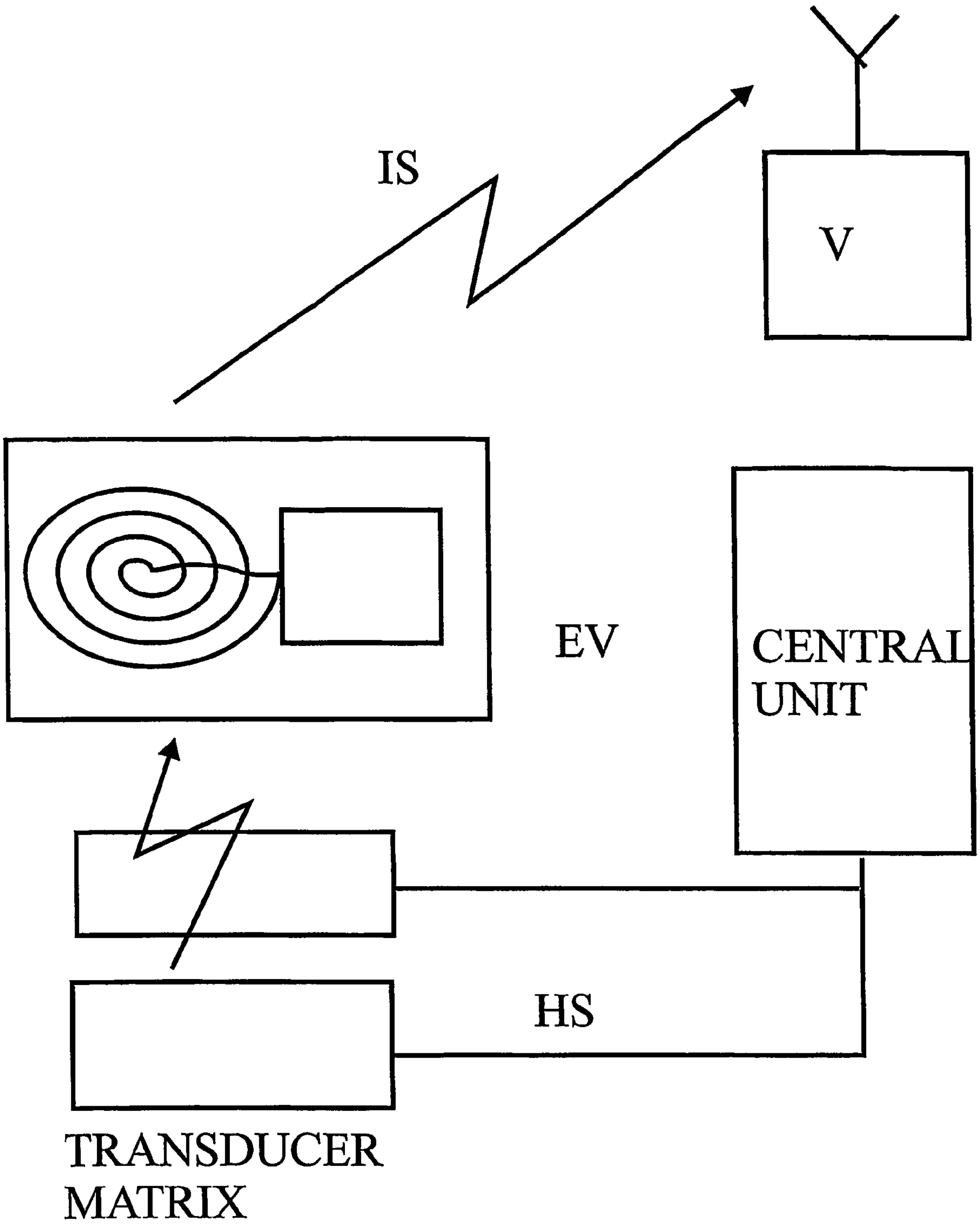
FIG. 8 shows a special means activated by the excitation signal and the signal of the special means is received by receiver means

An excitation signal HS conducted to a transducer TRANSDUCER MATRIX may evoke in special means EV an another signal IS which is received by receiving means V, which may be connected to a central unit CENTRAL UNIT, This is shown in FIG. 8. The special means EV may include a resonance circuit which is excited by an electromagnetic field generated by HS. If this circuit includes means to generate harmonics, such as a semiconductor device or some other nonlinear component, this circuit generates harmonics, which as a signal IS will be coupled to the receiving means V. In this case the special means EV do not need own power source. On the other hand EV may also include some active components and a power source. such as a battery. IS may also include some information about the special means EV, about their environment or about an object O. Some information may be included in a signal emitted by special means EV by include in the special means a RFID (Radio Frequency Identification) circuit which are nowadays used in packages and tickets which are readable from a distance.

In that case when by using an excitation signal HS one specifically is aiming to evoke a signal IS emitted by special means EV, it may be advantageous to connect the excitation signal HS to a distribution of conductor, which by its size and shape differs from such a distribution of conductor which is used for localization of an object O. In this way one aims to generate an electromagnetic field emitted by the distribution of conductor that progress distant enough from the distribution of conductor. One may also change one or several properties so that the electromagnetic field emitted by the distribution of conductor changes its characteristics.

For example by changing a frequency the distribution of conductor which for localization of an object emits a high impedance field emits mainly low impedance magnetic field. IF the frequency of HS is high enough the emitted field will be an electromagnetic field which contains relatively intense electric and magnetic field components.

With a help of special means one may indicate a localization of an object, be it a person, animal or artefact localisation in the environment to be monitored individually. So one may for example differentiate in the environment to be monitored a person from a domestic animal or localize lost artefacts such as wallets, keys or the like.

The invention is not limited to the above embodiments but a plurality of modifications can be considered plausible within the scope of the annexed claims.

The invention claimed is:

1. A method to monitor localization, posture, movement or properties of one or several objects to be monitored in an environment to be monitored, wherein in the area of the environment to be monitored there is a transducer which is composed of a distribution of conductors, which are electrically insulated from the object and said distribution of conductors includes at least a first division of selectable conductors and a second division of selectable conductors, the method comprising the steps of a) selecting the conductors of the first division of conductors and conductors of the second division of conductors and connecting an excitation signal to the selected first division of conductors and performing a scanning cycle of the selected divisions of the selected conductors when the excitation signal is connected to the first division of the selected conductors;

b) deriving a first signal from a coupling of the excitation signal between the first and the second selected divisions of conductors, and processing said first signal to obtain information about impedance of the object for characterization of the object.

2. The method according to claim 1 wherein said scanning cycle is repeated by selecting the first or second division of conductors to contain one or several conductors other than the conductors of the first or second division of conductors selected during a previous scanning.

3. The method according to claim 1 wherein from said first signal one derives information about essentially internal properties of the object.

4. The method according to claim 1 wherein from said first signal information which is characteristic to the object is derived, wherein the information includes information about electrical conductivity and variations in that electrical conductivity, and wherein said information is used to recognize the object.

5. The method according to claim 1 wherein the excitation signal evokes a second signal in a special means and the second signal is received by a receiving means.

6. The method according to claim 5 wherein said second signal contains information related to the object.

7. The method according to claim 5 wherein information derived from one or both of said first and second signals is evaluated to form an evaluation using criteria which are either fixed, preset or adaptable and, based on results of the evaluation, the method further comprises performing a known action.

8. The method according to claim 5 wherein information derived from one or both of said first and second signals is stored in memory means in order to observe temporal dependence of behavior of environments to be monitored and of objects.

9. The method according to claim 5 wherein information derived from one or both of said first and second signals is used to adapt a status of artificial intelligence.

10. An arrangement to monitor localization, posture, movement or properties of one or several objects to be monitored in an environment to be monitored wherein the arrangement includes:

a) transducer means which is composed of a distribution of conductors, which are galvanically isolated from the object, the distribution of conductors including at least a first division of selectable conductors and a second division of selectable conductors;

b) means to perform a scanning cycle of the second division of selectable conductors;

c) means to generate an excitation signal during the scanning cycle;

d) means to selectively connect said excitation signal to the first division of selectable conductors of the transducer means;

e) means to derive a first signal which is related to a coupling through impedance of the object; and f) means for detecting changes of the impedance of the object to be monitored for obtaining information about characteristic features of the object to be monitored.

11. The arrangement according to claim 10 wherein the arrangement further includes a signal processing means to process the first signal from transducer means and to derive information related to properties of the object.

12. The arrangement according to claim 11 wherein the signal processing means includes means to transfer information derived from an object forward via a first transmission path.

13. The arrangement according to claim 10 wherein the transducer means includes components to detect at least two different physical quantities.

14. The arrangement according to claim 10 wherein the first signal produced by the transducer means is based at least partially on an electric field coupling between the object and the transducer means.

15. The arrangement according to claim 11 wherein the signal processing means includes means which are arranged to perform adaptive functions or other means of artificial intelligence.

16. The arrangement according to claim 10 wherein the arrangement includes means to store spatial information related to the transducer means.

17. The arrangement according to claim 12 wherein via the transducer means information about localization of at least one division of selectable conductors and means to transfer this information is forwarded via a second transmission path.

18. The arrangement according to claim 10 wherein the arrangement includes a special means, which generates a second signal by an effect of the excitation signal.

19. The arrangement according to claim 10 wherein the arrangement includes means to form a contact via a transmission path to be used in receiving or transmitting control information, in receiving or transmitting localization information or receiving or transmitting time information or for other communication with other systems.

20. The arrangement according to claim 18 wherein information derived from the first signal, the second signal or the excitation signal, or combinations thereof, is used to perform control functions with some means of the arrangement, wherein the control functions include controlling a robot, lighting, air conditioning, alarm systems, announcement systems or locking.

21. The arrangement according to claim 10 wherein the arrangement includes means to derive information characterizing movement of an object.

22. The arrangement according to claim 10 wherein at least one division of selectable conductors of the transducer means are placed near a floor, a wall or a ceiling surface, on which or near which an object has access.

23. The arrangement according claim 10 wherein at least one division of selectable conductors of the transducer means are placed near surfaces of the environment to be monitored.

24. The arrangement according to claim 10 wherein at least one division of selectable conductors of the transducer means is realized by using some conductors which are in construction elements of the environment to be monitored.

25. The arrangement according to claim 18 wherein the special means includes means to implement information in the second signal generated by the special means.

26. The arrangement according to claim 18 wherein one or several properties of the excitation signal are different when the second signal generated by the special means is evoked referenced to localization of an object.

27. The method according to claim 1, wherein one or several objects to be monitored include a human body, an animal or a robot.

28. The method according to claim 1, wherein the environment to be monitored includes a residence, a public space, an industrial space, an office space or an animal shelter.

29. The method according to claim 1, wherein the area of the environment to be monitored includes a floor, a wall, or a ceiling.

30. The method according to claim 3, wherein internal properties of the object include an electric conductivity and its variations, a distribution of tissues in a body, a distribution of fluids, or a function of the heart or respiration.

31. The method according to claim 8, wherein at a certain moment registered information which is derived from the first or second signals is stored and this information is used as reference information for derived information at a later moment.

32. The arrangement according to claim 10, wherein one or several objects to be monitored include a human body, an animal or a robot.

33. The arrangement according to claim 10, wherein the environment to be monitored includes a residence, a public space, an industrial space, an office space or an animal shelter.

34. The arrangement according to claim 11, wherein properties of the object include a function of the heart, respiration or an electric conductivity.

35. The arrangement according to claim 12, wherein the first transmission path includes a telephone network or a digital television network.

36. The arrangement according to claim 13, wherein the at least two different physical quantities include electrical coupling and acoustic energy.

37. The arrangement according to claim 23, wherein the environment to be monitored includes an area surrounding a hazardous substance, an area surrounding a piece of artwork or an area surrounding an artifact.

38. The arrangement according to claim 24, wherein construction elements include concrete, iron, air conditioning pipes, air conditioning ducts, water pipes or electrical conductors.

39. The arrangement according to claim 25, wherein the special means includes a RFID circuit, a transducer or an active circuit.

* * * * *